United States Patent [19]

Ohishi

[11] Patent Number: 5,134,479
[45] Date of Patent: Jul. 28, 1992

[54] NTSC HIGH RESOLUTION TELEVISION CONVERTING APPARATUS FOR CONVERTING TELEVISION SIGNALS OF AN NTSC SYSTEM INTO HIGH RESOLUTION TELEVISION SIGNALS

[75] Inventor: Tomofumi Ohishi, Kashiwa, Japan

[73] Assignee: Sharp Kabushiki Kaisha, Osaka, Japan

[21] Appl. No.: 653,824

[22] Filed: Feb. 11, 1991

[30] Foreign Application Priority Data

Feb. 16, 1990 [JP] Japan .................................. 2-35859

[51] Int. Cl.$^5$ .............................................. H04N 7/01
[52] U.S. Cl. ...................................... 358/140; 358/11
[58] Field of Search .................... 358/140, 141, 11, 12

[56] References Cited

U.S. PATENT DOCUMENTS

| | | | |
|---|---|---|---|
| 4,670,783 | 6/1987 | Nadan | 358/141 |
| 4,730,215 | 3/1988 | Jose et al. | 358/140 |
| 4,794,456 | 12/1988 | Tsinberg | 358/140 X |
| 4,845,562 | 7/1989 | Koslov et al. | 358/141 |

FOREIGN PATENT DOCUMENTS 61-267469 11/1986 Japan .

*Primary Examiner*—Victor R. Kostak
*Attorney, Agent, or Firm*—David G. Conlin; Robert F. O'Connell

[57] ABSTRACT

A video signal based on an NTSC system is converted into a signal for EDTV. The converted signal is subjected to signal compression in a signal compression ratio of 910/m times. The compressed signal is added with a pedestal level signal and a side level signal. The combined signal is converted into an analog signal, and thereafter primary color signals R, G and B are generated to be imaged on a high resolution television monitor. Thus, the original video of the NTSC system can accurately be reproduced with respect to a high resolution television monitor with an aspect ratio of 16:9.

4 Claims, 4 Drawing Sheets

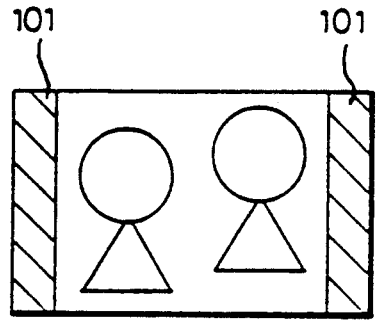
FIG. 1A
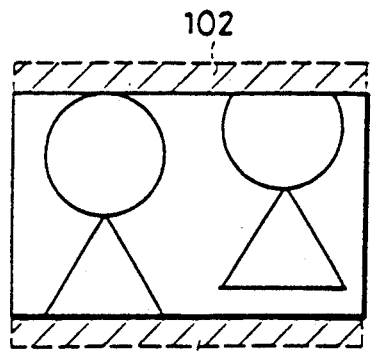
FIG. 1B
FIG. 2
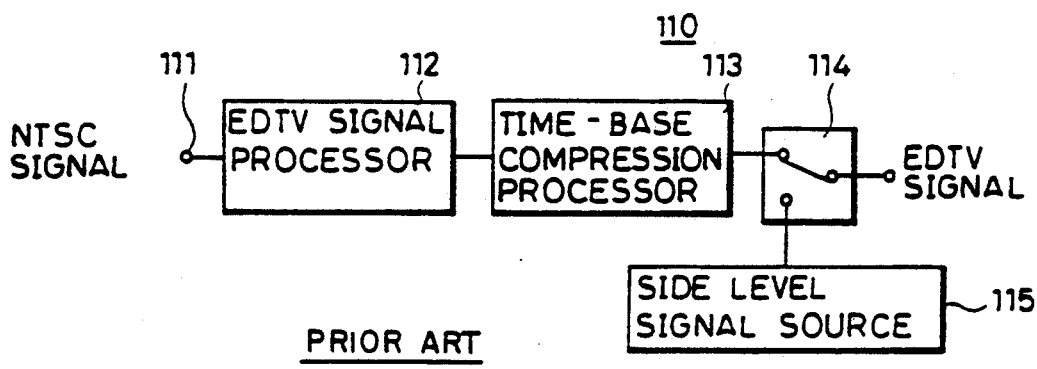
PRIOR ART
FIG. 3
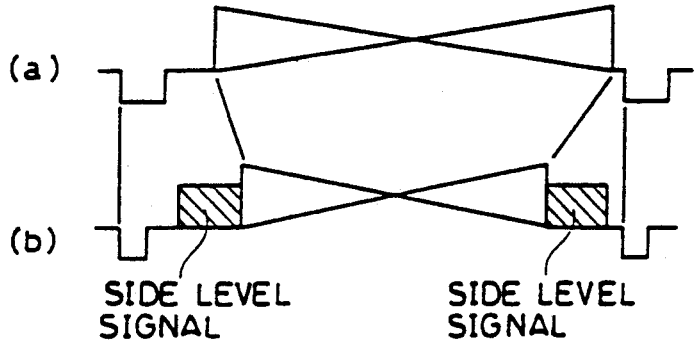
EDTV SIGNAL
WAVEFORM
DIAGRAM
PRIOR ART

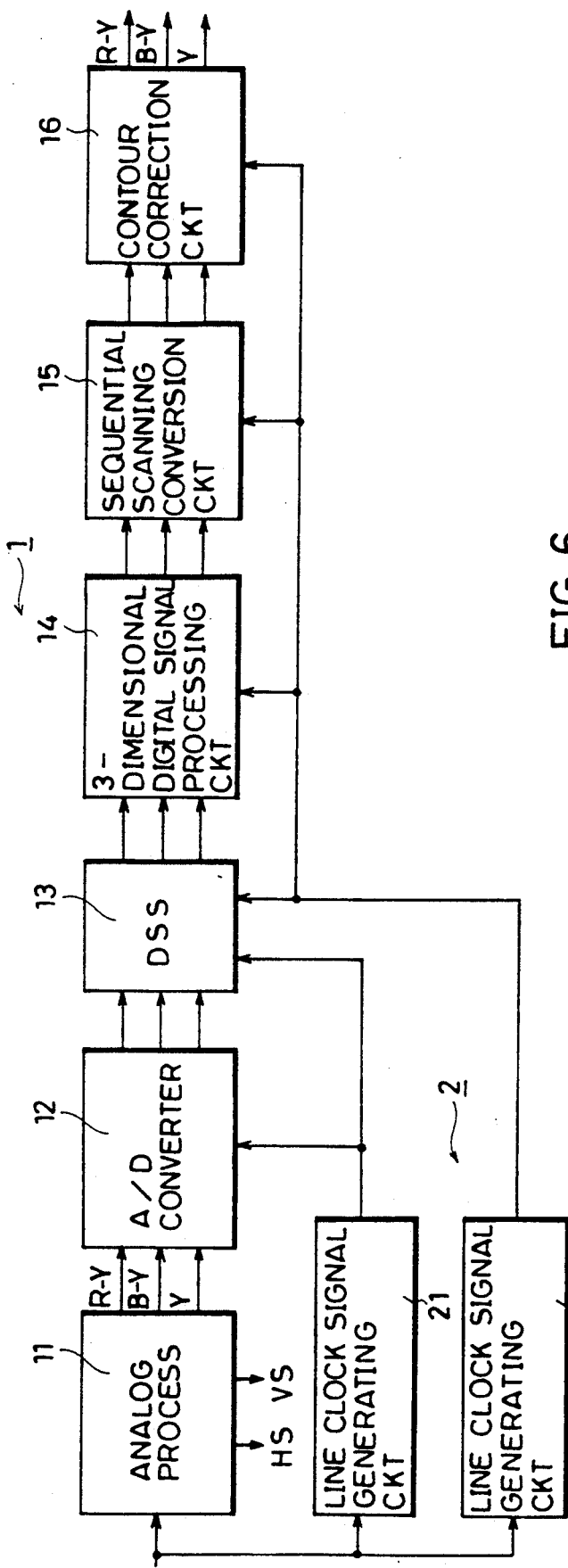
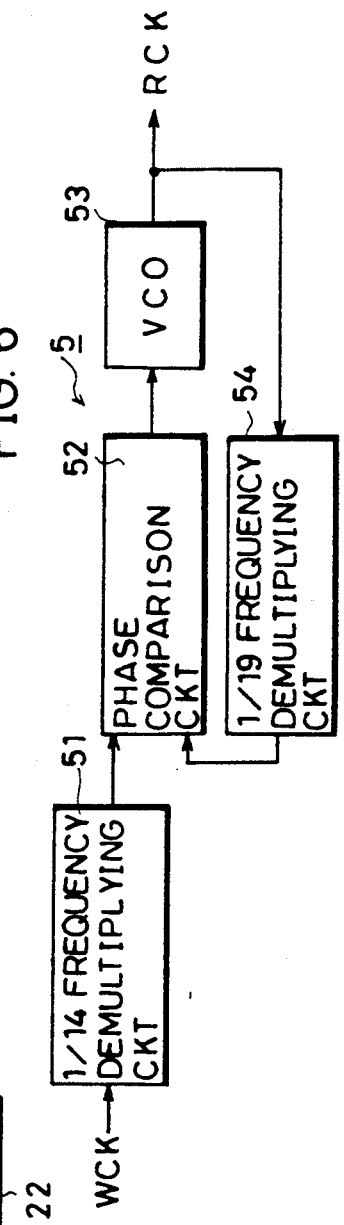

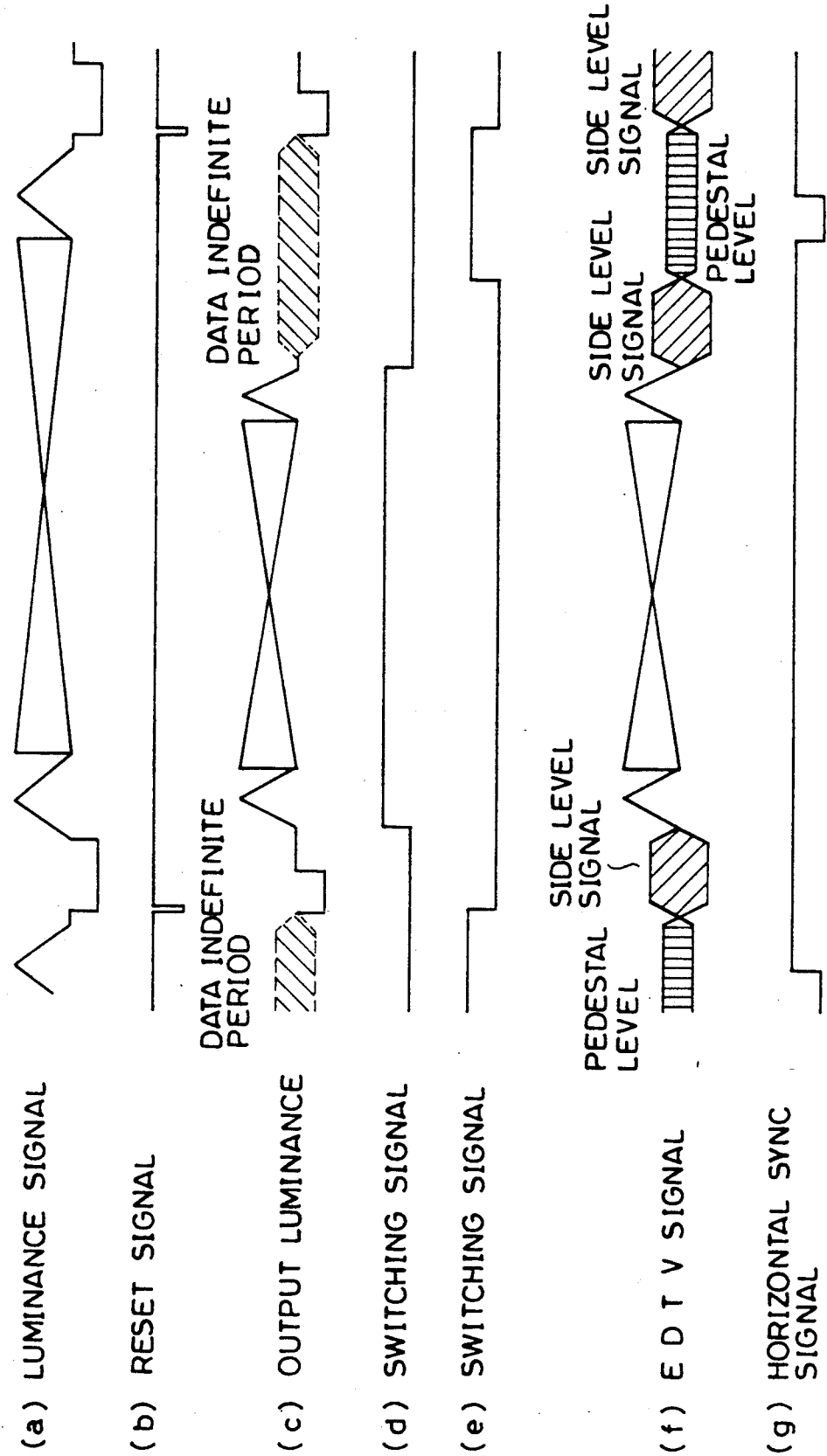

NTSC HIGH RESOLUTION TELEVISION CONVERTING APPARATUS FOR CONVERTING TELEVISION SIGNALS OF AN NTSC SYSTEM INTO HIGH RESOLUTION TELEVISION SIGNALS

BACKGROUND OF THE INVENTION

1. Field of the Invention

The present invention relates generally to NTSC high resolution television converting apparatus and, more particularly, to NTSC high resolution television converting apparatus for enabling a video signal based on an NTSC system (hereinafter abbreviated as NTSC signal) to be imaged onto a high resolution television monitor having an aspect ratio of 16:9.

2. Description of the Background Art

In recent years, as color television receivers require larger-scale screens, degradations in picture quality due to the NTSC system becomes a significant problem. In order to solve this problem, a high resolution television system is proposed and is in practical use as a new video service including information approximately five times as much as the information included in the present NTSC system and providing a highly improved picture quality. The high resolution television system has originally been considered as a new television system unrelated with existing systems and hence is incompatible with the present NTSC system as it is. It is inefficient, however, to own two separate receivers: the one for NTSC and the other for a high resolution television at the stage of propagation of the high resolution television system. It is thus desirable that both the present NTSC system and the high resolution television system can be received by employing only either one of those receivers.

FIGS. 1A and 1B are diagrams illustrating an example of a display in the case where a video having an aspect ratio of 4:3 (a video such as of an NTSC signal) is imaged on a high resolution television monitor having an aspect ratio of 16:9. If video information with the aspect ratio of 4:3 are all displayed on the high resolution television monitor with the aspect ratio of 16:9, blank spaces 101 are provided at both the left and right sides of the monitor by time-base compression of a video period in a horizontal direction. A side level signal (a gray level in general) is inserted into the spaces 101 to prevent the burning of a fluorescent material applied on a CRT. Further, as shown in FIG. 1B, if the video is enlarged so that it can be imaged on the entire display screen of the high resolution television monitor with the aspect ratio of 16:9, the video with the aspect ratio of 4:3 has its top and bottom portions 102 cut away. Thus, the display method shown in FIG. 1A is indispensable when the video is imaged on the high resolution television monitor.

FIG. 2 is a block diagram showing one example of a converter for displaying a video in the display manner shown in FIG. 1A. With reference to FIG. 2, an NTSC signal is applied to an input terminal 111. The NTSC signal has, as already known, 525 scanning lines per frame, an interlace of 2:1, a field frequency of 59.94 Hz and a line frequency of 15.73 kHz. This NTSC signal is applied to a signal processor 112 for processing of an EDTV (Extended Definition TV) signal, to be converted into a signal (EDTV signal) having 525 scanning lines per frame, a sequential scanning of 1:1, a frame frequency of 59.94 Hz and a line frequency of 31.468 kHz.

EDTV signal processor 112 serves as a signal converter for achieving a higher picture quality while maintaining the compatibility of an NTSC signal. More specifically, EDTV signal processor 112 performs signal processings such as motion adaptive three-dimensional Y/C separation and sequential scanning conversion.

FIG. 3 is a diagram illustrating the waveform of an output signal applied from EDTV signal processor 112 shown in FIG. 2 only during one horizontal scanning period. A video signal subjected to signal conversion for EDTV has its time base in a horizontal scanning direction compressed by a time-base compression processor 113. This time-base compression causes a blank period in one horizontal scanning period. Thus, a signal switch 114 is provided at the succeeding stage of time-base compression processor 113, and a side level signal generating source 115 is also provided. The time-base compressed video signal and side level signal are appropriately switched by signal switch 114, so that the EDTV signal shown in FIG. 3(b) is output.

As one of methods for time-base compression, a method employing a FIFO type line memory is provided. When a compression ratio is n (n<1), a video signal corresponding to one horizontal scanning period, which is a write clock signal in the line memory, is first written into the line memory. The video signal written in the line memory is then read out in response to a read clock signal having a frequency 1/n times that of the write clock signal.

The problem to be discussed here is to which value the compression ratio n should be set. As far as the aspect ratio of the signals is simply concerned, since a video of 12:9 in width to length (the aspect ratio of 4:3) is imaged on the screen of 16:9 in width to length (the aspect ratio of 16:9), the compression ratio n should be $n = 12/16 = \frac{3}{4}$.

This value of compression ratio n is, however, given irrespectively of a blanking period of a video signal and an overscanning rate of the monitor. As a practical matter, if an NTSC signal is imaged on the high resolution television monitor with the aspect ratio of 16:9, a perfect circle must be reproduced accurately as a perfect circle. If the above-described compression ratio $\frac{3}{4}$ is adopted, the original perfect circle becomes slightly oval. Moreover, since a basic clock signal of EDTV signal processor 112 is $8 \cdot f_{sc} (= 28.6 \text{ MHz})$ in general, the sampling number of one horizontal scanning period is 910. In time-base compression processor 113, the video signal is time-base compressed only during a video period, and thus the length of one horizontal scanning period is invariable, as apparently seen from FIG. 3(a) and (b). In the line memory provided in time-base compression processor 113, an NTSC signal is written in response to a clock signal of $8 \cdot f_{sc}$ and read out at the frequency of a read clock signal of $8 \cdot f_{sc} \times 1/n$. Accordingly, if one horizontal scanning period is sampled at this frequency, the sampling number is 910/n. The above-described value of 910/n should be an integer when the compression ratio n is selected. If the value 910/n is not an integer, the video is out of phase one by one line, so that vertical lines are in the form of steps.

As described above, when the compression ratio is $\frac{3}{4}$, the value 910/n is $910/n = 910 \times 4/3 \approx 1213.33$. Since the obtained value is not an integer, the foregoing out-of-phase is generated.

SUMMARY OF THE INVENTION

A principal object of the present invention is therefore to provide an NTSC high resolution television converting apparatus capable of achieving an enhancement in reproduction and precision after conversion of a video.

Briefly, in accordance with the present invention, a video signal based on the NTSC system is converted into a video signal for EDTV. Only a video period of the signal-converted video signal is time-base compressed by 910/m times in a horizontal direction. This compression ratio 910/m is condition for which the ratio of the sampling number of the video signal to the compression ratio is an integer. The video signal which is time-base compressed by 910/m times and a side level signal are switched at appropriate time, so as to be imaged on a high resolution television monitor having an aspect ratio of 16:9.

Therefore, in accordance with the present invention, the video signal based on the NTSC system can be accurately reproduced with respect to the high resolution television monitor with the aspect ratio of 16:9.

Preferably, both a denominator and numerator constituting the compression ratio n in a video display period are an integer of two digits.

More preferably, a write clock signal synchronized with the video signal of the NTSC system and a read clock signal provided by multiplying this write clock signal by m/910 are generated. A signal processed in an EDTV signal processor is written into a line memory in response to the generated write clock signal. The signal written in the line memory is read out in response to the generated read clock signal, so that the time base of the signal is compressed.

Therefore, a read clock signal generating circuit for multiplying by m/910 can be simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are diagrams illustrating an example in which a video signal of an NTSC system is displayed on a high resolution television monitor having an aspect ratio of 16:9;

FIG. 2 is a block diagram showing one example of a converter for implementing the display example shown in FIG. 1A;

FIG. 3 is a signal waveform diagram illustrating the waveform of a signal output from an EDTV signal processor shown in FIG. 2;

FIG. 5 is a detailed block diagram of an EDTV signal processor shown in FIG. 4;

FIG. 6 is a detailed block diagram of a clock signal generator shown in FIG. 4; and FIG. 7 is a waveform diagram for explaining an operation of one embodiment of the present invention.

DESCRIPTION OF THE PREFERRED EMBODIMENTS

Figure 4:
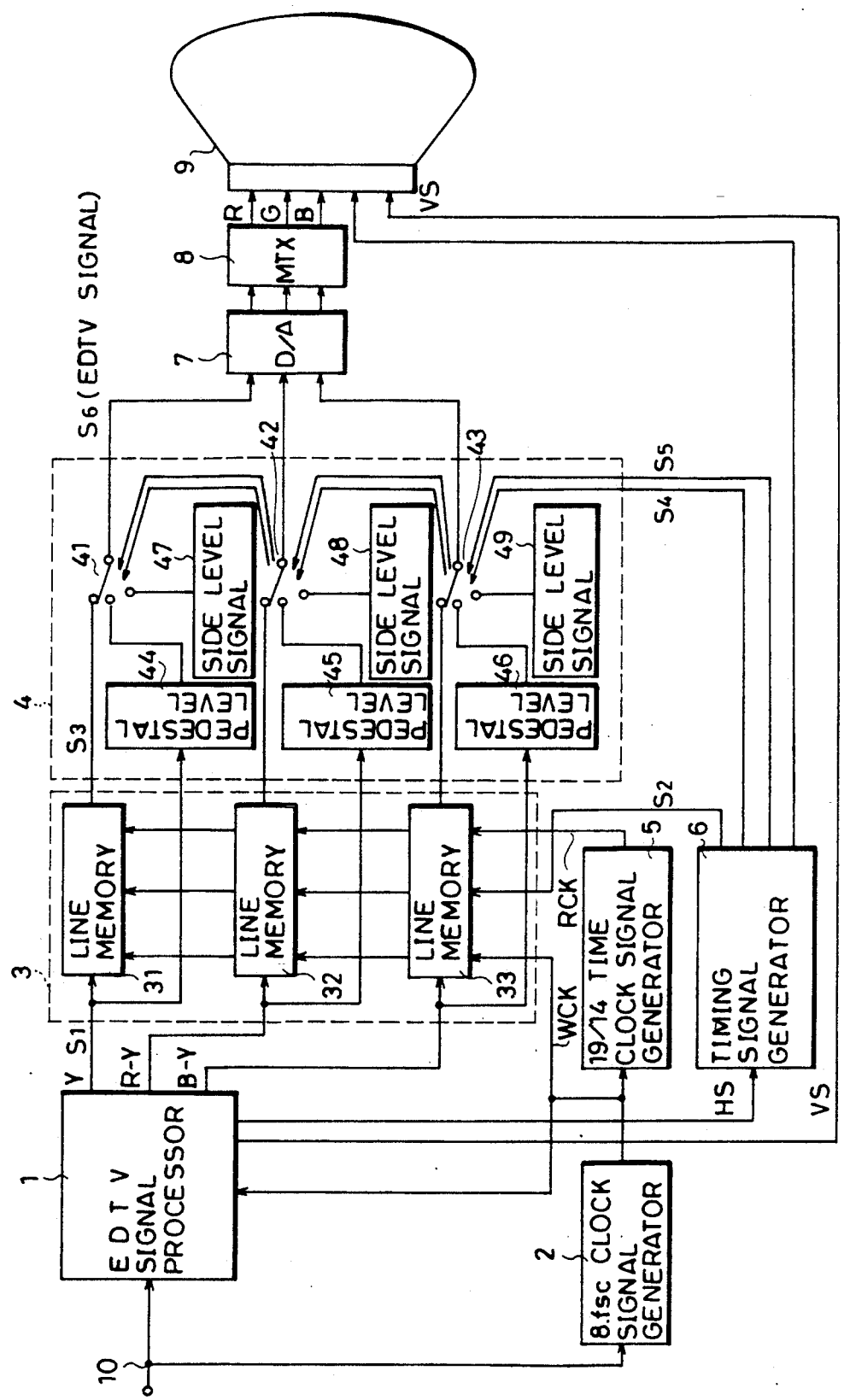
FIG. 4 is a detailed block diagram of one embodiment of the present invention.

FIG. 4 is a detailed block diagram of one embodiment of the present invention. A structure of this embodiment will now be described with reference to FIG. 4. An NTSC signal is applied through an input terminal 10 to an EDTV signal processor 1. EDTV signal processor 1 converts the applied NTSC signal into a video signal having 525 scanning lines per frame, a sequential scanning of 1:1, a frame frequency of 59.94 Hz and a line frequency of 31.468 kHz (i.e., a luminance signal Y and a pair of color difference signals R-Y and B-Y). EDTV signal processor 1 outputs those video signals and also a horizontal synchronizing signal HS and a vertical synchronizing signal VS, to apply the horizontal synchronizing signal HS to a timing signal generator 6 and the vertical synchronizing signal VS to a high resolution television monitor 9.

The video signals converted in EDTV signal processor 1 are applied to a time-base compression processor 3. Time-base compression processor 3 includes three line memories 31, 32 and 33 in accordance with the number of the video signals applied from EDTV signal processor 1.

The NTSC signal applied through input terminal 10 is also applied to a clock signal generator 2. Clock signal generator 2 responds to subcarrier $f_{sc}$ extracted from the NTSC signal or to the horizontal synchronizing signal, to supply as an output a basic clock signal WCK (having a frequency of $8 \cdot f_{sc}$) for use in EDTV signal processor 1. This basic clock signal WCK is further applied to a clock signal generator 5 for signal compression. Clock signal generator 5 converts the frequency of the basic clock signal WCK into the frequency of 19/14 (1235/910) times, to supply a read clock signal RCK as an output in the case of this embodiment. The basic clock signal WCK is applied as a write clock signal to EDTV signal processor 1 and each of line memories 31, 32 and 33. Each of line memories 31, 32 and 33 responds to the basic clock signal WCK to serially write the luminance signal Y and the color difference signals R-Y and B-Y applied from EDTV signal processor 1. The read clock signal RCK supplied as an output from clock signal generator 5 is applied to line memories 31, 32 and 33, so that line memories 31, 32 and 33 respond to the read clock signal RCK to read out the written luminance signal Y and the written color difference signals R-Y and B-Y. Accordingly, the luminance signal Y and the color difference signals R-Y and B-Y have their time bases compressed by 14/19 times.

Now, a compression ratio n is $$n = 910/m \quad (m: \text{integer}) \qquad (1)$$

in this embodiment of the present invention. This is because the following condition is provided as condition that a video is not out of phase.

(1) The value 910/n must be an integer.

The value n=14/19 in this embodiment is provided when m=1235 is satisfied in the above equation (1). The following condition is provided as condition to which value the value m should be set specifically.

(2) When a video is imaged on a high resolution television monitor having an aspect ratio n of 16:9, a perfect circle must be reproduced in such a perfect circle ratio that the perfect circle can be viewed as a perfect circle.

Next, the value n for satisfying the above condition (2) is obtained. A line frequency fh and a horizontal effective period th of a video signal of a high resolution television system are as follows:

fh = 33.75 kHz (=29.63 μsec)

$$fh = 33.75 \text{ kHz } (= 29.63 \text{ }\mu\text{sec})$$
$$th = 29.63 - 3.77 \text{ }\mu\text{sec}$$
$$= 25.86 \text{ }\mu\text{sec}$$

(Horizontal blanking period = 3.77μsec)

A line frequency fe and a horizontal effective period te of a video signal subjected to EDTV signal processing are as follows:
fe = 31.468 kHz (31.78 μsec)

$$fe = 31.468 \text{ kHz } (31.78 \text{ }\mu\text{sec})$$
$$te = 31.78 \times 0.83 \text{ }\mu\text{sec}$$
$$= 26.37 \text{ }\mu\text{sec}$$

(Horizontal scanning period ratio = 83%)

Since the line frequency fh and horizontal effective period th and the line frequency fe and horizontal effective period te are in the above-described relation, the signal of the horizontal effective period te (26.37μsec) of an EDTV signal should be compressed during the period ¾ of the horizontal effective period th (25.86μsec) of a high resolution television signal. That is, $$25.86 \times \tfrac{3}{4} = 26.37 \times n$$
$$\therefore n = 25.86/26.37 \times \tfrac{3}{4}$$

Next, the following relation is provided according to the condition (1).

$$m = 910/n \text{ } (m: \text{ integer})$$
$$= 910 \times 26.37/25.86 \times 4/3$$
$$\approx 1237$$

Therefore, the compression ratio n satisfying the conditions (1) and (2) is as follows:

$$910/n = 1237$$
$$\therefore n = 910/1237$$

Thus, the optimal value of the compression ratio n is obtained where m = 1237 is satisfied.

In the case of the actual implementation on a hardware basis, a read clock signal RCK having a frequency 1/n times that of a write clock signal WCK of line memories 31, 32 and 33 employed for time-base compression should be produced to achieve the time-base compression. Clock signal generator 5 is in general constituted by a PLL circuit as will be described in FIG. 6; however, it is desirable that the value 1/n is a simple fraction from the aspect of circuit configuration and the stability and performance of the PLL circuit.

As the compression ratio n deviates from the optimal value, the displayed perfect circle is deformed into an oval; however, the deviation up to approximately 2% can hardly be viewed by human eyes. Thus, the compression ratio n should be set in the range of approximately ±2% from the optimal value. Accordingly, the value n' = 14/19 (= 910/12135) is obtained as the simplest fraction close to the value 910/1237. The error between n and n' is less than 0.2%, which is the level hardly objectionable to the eyes when displayed on a screen.

For the above-described reason, the compression ratio n is set to n = 14/19 in this embodiment. Several values represented by comparatively simple fractions within ±2% from the optimal value are shown as other compression ratios in table 1 below.

TABLE 1

| Compression ratio | Deviation from optimal value (%) |
|---|---|
| 13/18 (= 910/1260) | −1.83 |
| 14/19 (= 910/1235) | 0.16 |
| 26/35 (= 910/1225) | 0.98 |
| 35/47 (= 910/1222) | 1.23 |
| 35/48 (= 910/1246) | −0.88 |
| 65/87 (= 910/1218) | 1.56 |
| 65/88 (= 910/1232) | 0.41 |
| 65/89 (= 910/1246) | −0.72 |
| 70/97 (= 910/1261) | −1.90 |

In implementation of a system in practice, values which are easily obtainable in this system are employed.

The luminance signal Y and color difference signals R-Y and B-Y read from line memories 31, 32 and 33 are applied to a signal switch 4. Signal switch 4 includes change-over switches 41, 42 and 43, pedestal level extracting circuits 44, 45 and 46 and side level signal sources 47, 48 and 49. The luminance signal Y and color difference signals R-Y and B-Y respectively output from line memories 31, 32 and 33 are applied to first contacts of respective change-over switches 41, 42 and 43. Pedestal level extracting circuits 44, 45 and 46 extract respective pedestal levels from the luminance signal Y and color difference signals R-Y and B-Y output from EDTV signal processor 1, to apply respective pedestal level signals to second contacts of respective change-over switches 41, 42 and 43. Side level signal sources 47, 48 and 49 generate respective side level signals to apply the same to third contacts of respective change-over switches 41, 42 and 43. Change-over switches 41, 42 and 43 are switched in response to switching signals S4 and S5 synchronized with a horizontal synchronizing signal HS from timing signal generator 6. The signals selected by change-over switches 41, 42 and 43 are applied to a D/A convertor 7, to be converted into analog signals, so that the analog signals are applied to a matrix circuit 8. Matrix circuit 8 converts outputs of D/A converter 7 into primary color signals of R, G and B, so that the primary color signals are applied to high resolution television monitor 9.

FIG. 5 is a detailed block diagram of EDTV signal processor 1 shown in FIG. 4. A brief description will now be given on EDTV signal processor 1 with reference to FIG. 5. An analog process circuit 11 carries out two-dimensional Y/C separation in response to a video signal of NTSC to output a luminance signal Y and color difference signals R-Y and B-Y and also to output a horizontal synchronizing signal HS and a vertical synchronizing signal VS. The luminance signal Y and color difference signals R-Y and B-Y are applied to an A/D convertor 12, to be converted into digital signals. The converted digital signals are applied to a DSS circuit 13. DSS circuit 13 serves as a digital sync stabilizer. This DSS function is such a function that when a video signal having a fluctuation component of a horizontal period is applied as an input, this applied horizontal period fluctuation component is absorbed to be converted into a video signal of a constantly stable horizontal period. Specifically, a buffer memory corresponding to two lines is employed for each signal line, so that signals are written into the buffer memory in response to a line clock signal generated from a line clock signal generating circuit 21 which is phase-following the horizontal period fluctuation of an input signal. Then, the signals are read from the buffer memory in response to a stable clock signal locked into the average frequency of the horizontal periods of input signals generated from a line clock signal generating circuit 22. In this manner, the video signal is modified into a synchronously stable signal by the DSS function and then applied to a three-dimensional digital signal processing circuit 14 prior to various digital signal processings. Three-dimensional digital signal processing circuit 14 processes the applied digital signal under three-dimensional Y/C separation and also generates a three-dimensional interpolation signal to apply the same to a sequential scanning conversion circuit 15. Sequential scanning conversion circuit 15 double-speed converts an interpolation signal and the present signal to apply the double-speed converted signals to a contour correction circuit 16. Contour correction circuit 16 subjects the double-speed converted signals to contour correction, to supply a luminance signal Y and color difference signals R-Y and B-Y as outputs.

FIG. 6 is a detailed block diagram of clock signal generator 5 shown in FIG. 4. Clock signal generator 5 includes a 1/14 frequency-demultiplying circuit 51, a phase comparison circuit 52, a voltage-controlled oscillator (VCO) 53 and a 1/19 frequency-demultiplying circuit 54. 1/14 frequency-demultiplying circuit 51 1/14 frequency-demultiplies a write clock signal WCK to apply the demultiplied signal to one input of phase comparison circuit 52. VCO 53 supplies a read clock signal RCK as an output in response to an error voltage supplied by phase comparison circuit 52, to apply the same to 1/19 frequency-demultiplying circuit 54. 1/19 frequency-demultiplying circuit 54 1/19 frequency-demultiplies the applied read clock signal RCK to apply the demultiplied signal RCK to phase compression circuit 52. Phase comparison circuit 52 compares between the phase of an output of 1/14 frequency-demultiplying circuit 51 and the phase of an output of 1/19 frequency-demultiplying circuit 54, to supply an error voltage to VCO 53. In this manner, the write clock signal WCK is multiplied by 19/14 to produce the read clock signal RCK.

FIG. 7 is a waveform diagram for explaining an operation of one embodiment of the present invention.

A detailed operation of the embodiment of the present invention will now be described with reference to FIGS. 4-7.

EDTV signal processor 1 converts an NTSC signal into a video signal having 525 scanning lines per frame, a sequential scanning of 1:1, a frame frequency of 59.94 Hz and a line frequency of 31.468 kHz. The converted luminance signal Y has a waveform shown in FIG. 7(a). EDTV signal processor 1 outputs a horizontal synchronizing signal HS and a vertical synchronizing signal VS in response to the applied NTSC video signal. Clock signal generator 2 generates a write clock signal WCK in synchronization with subcarrier $f_{sc}$ or the horizontal synchronizing signal extracted from the NTSC signal, to apply the generated write clock signal WCK to EDTV signal processor 1, clock signal generator 5 and line memories 31, 32 and 33. Line memories 31, 32 and 33 write luminance signal Y and color difference signals R-Y and B-Y therein in synchronization with the write clock signal WCK. Clock signal generator 5 generates a read clock signal RCK in response to the write clock signal WCK. Line memories 31, 32 and 33 read each signal in synchronization with this read clock signal RCK. Accordingly, the luminance signal Y and color difference signals R-Y and B-Y have their time bases compressed by 14/19 times.

Timing signal generator 109 outputs a reset signal shown in FIG. 7(b) in synchronization with the horizontal synchronizing signal, to apply the reset signal to line memories 31, 32 and 33 to reset a write state and a read state. As a result, a luminance signal which is time-base compressed shown in FIG. 7(c) is, for example, supplied as an output from line memory 31. Now, the sampling number in one horizontal scanning period to be written into line memories 31, 32 and 33 is 910, while the sampling number in one horizontal scanning period to be read in response to the read clock signal RCK is 1235 (where n=14/19). As a result, signal data in addresses 911-1235 of the signals read from line memories 31, 32 and 33 become indefinite, and there exists a data indefinite period shown in FIG. 7(c). In order to eliminate this data indefinite period, change-over switches 41, 42 and 43 of signal switch 4 are switched, so that a pedestal level and a side level are added. Pedestal level extracting circuits 44, 45 and 46 extract pedestal levels from respective output signals of EDTV signal processor 1, to apply pedestal level signals to change-over switches 41, 42 and 43. These pedestal levels are required to reproduce a direct current component of a signal on the high resolution television monitor 9 side. Side level signal sources 47, 48 and 49 generate, for example, gray signals to apply the same to change-over switches 41, 42 and 43. Change-over switches 41, 42 and 43 are switched in response to switching signals S4 and S5 shown in FIG. 7(d) and (e) generated by timing signal generator 6, so that the pedestal level signal and the side level signal are combined with the luminance signal Y and the color difference signals R-Y and B-Y, respectively. Change-over switch 41 outputs the combined luminance signal shown in FIG. 7(f). That is, when switching signals S4 and S5 are at a logic high level and a logic low level, respectively, the time-base compressed luminance signal Y and color difference signals R-Y and B-Y are selected by change-over switches 41, 42 and 43. When switching signals S4 and S5 are at a logic low level and a logic high level, respectively, the pedestal level signal is selected. When switching signals S4 and S5 are both at a logic low level, the side level signal is selected. An EDTV signal applied from signal switch 4 is converted into an analog signal by D/A converter 7, then further converted into primary color signals R, G and B by matrix circuit 8 and then applied to high resolution television monitor 9.

A horizontal synchronizing signal S7 shown in FIG. 7(g) is generated by timing signal generator 6. The vertical synchronizing signal VS separated from the NTSC signal is employed in high resolution television monitor 9.

The phase relation, width, etc. of switching signals S4 and S5 and horizontal synchronizing signal S7 can be controlled by timing signal generator 5.

While the side level signal is inserted into the blank space produced by the time-base compression of the video period by 14/19 times in the foregoing embodiment, a separate video signal may be adopted as this side level signal. In this case, a so-called picture-in-picture function can be achieved and, if side panel information is entered, the second generation EDTV can easily be coped with.

As has been described heretofore, according to this embodiment, the NTSC signal is subject to an EDTV signal processing, so that an output signal thereof can be time-base compressed by 14/19 times in a horizontal direction. Specifically, when the value m=1235 is satisfied, for example, compression ratio n is 14/19, so that a video of the NTSC system can accurately be reproduced with respect to the high resolution television monitor having the aspect ratio of 16:9. Moreover, the selection of those compression ratios enables a simplification in the circuit configuration of the clock signal generator for time-base compression.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An NTSC high resolution television converting apparatus for converting a video signal based on an NTSC system into a video signal of a high resolution television system in order to display said video signal based on the NTSC system onto a high resolution monitor television receiver having a different aspect ratio, said apparatus comprising:

signal processing means for converting said video signal based on said NTSC system into a video signal for an EDTV;

time-base compression processing means for signal-compressing a video display period of an output signal of said signal processing means in a signal compression ratio of 910/m times in a horizontal direction, where said m is an integer in which the signal compression ratio n is within ±2% with respect to a signal compression ratio $n_0$ when m=1237 is set as a reference value; and signal switching means for switching between an output signal of said time-base compression processing means and a side level signal to be entered in a blank space produced when a time-base is compressed, to supply the switched signal as an output.

2. The NTSC high resolution television converting apparatus according to claim 1, wherein
   the compression ratio of said video display period is n, and a denominator and a numerator constituting the compression ratio n both include an integer of two digits.

3. The NTSC high resolution television converting apparatus according to claim 1, further comprising:
   write clock signal generating means for generating a write clock signal synchronized with said video signal of said NTSC system; and
   read clock signal generating means for generating a read clock signal by multiplying by m/910 the write clock signal generated by said write clock signal generating means, wherein
   said time-base compression processing means comprises a line memory for serially writing the output signal of said signal processing means in response to the write clock signal generated by said write clock signal generating means and reading said written signal in response to the read clock signal generated by said read clock signal generating means.

4. The NTSC high resolution television converting apparatus according to claim 1, further comprising:
   pedestal level extracting means for extracting a pedestal level from the output signal of said signal processing means to supply a pedestal level signal as an output; and
   side level signal applying means for supplying said side level signal as an output, wherein
   said signal switching means comprises means for selecting the side level signal supplied as an output from said side level signal applying means in predetermined timing, then selecting an output signal of said time-base compression processing means and thereafter selecting said side level signal, and then selecting the pedestal level signal supplied as an output from said pedestal level signal applying means.

* * * * *